F. ANDREWS.
MARKING DEVICE FOR ATTACHMENT TO THE EARS OF ANIMALS.
APPLICATION FILED NOV. 25, 1910.

1,026,423.

Patented May 14, 1912.

Inventor
Frederick Andrews
Atty.

Witnesses

UNITED STATES PATENT OFFICE.

FREDERICK ANDREWS, OF MERCER, NEW ZEALAND.

MARKING DEVICE FOR ATTACHMENT TO THE EARS OF ANIMALS.

1,026,423.　　　　Specification of Letters Patent.　　Patented May 14, 1912.

Application filed November 25, 1910. Serial No. 594,219.

*To all whom it may concern:*

Be it known that I, FREDERICK ANDREWS, a subject of the King of Great Britain, residing at Mercer, in the Province of Auckland and Dominion of New Zealand, have invented certain new and useful Improvements in Marking Devices for Attachment to the Ears of Animals, of which the following is such a full, clear, and exact description as will enable any one skilled in the art to which it appertains to make and use the same, reference being had to the accompanying drawings, forming part of this specification.

This invention relates to ear-marking devices of the class in which a pair of washers, bearing any desired mark or sign, are secured upon the respective opposite sides of the ear.

In devices of this description as at present in use, the means of attachment comprises a cylindrical core or boss formed upon one of the washers, such core being passed through a suitable hole in the ear and the other washer placed upon the projecting end in which position it is secured by expanding or burring the end of the core.

In the use of devices such as above described, considerable difficulty has been experienced in satisfactorily burring the end of the core by means of pressure. With the object of overcoming this difficulty therefore, the present invention has been devised and consists essentially of an appliance which is so constructed that it permits of the use of a conical reamer for the purpose of forming the bur.

In order that the nature of my invention may be fully understood, reference will now be made to the accompanying drawings in which:—

Figure 1:
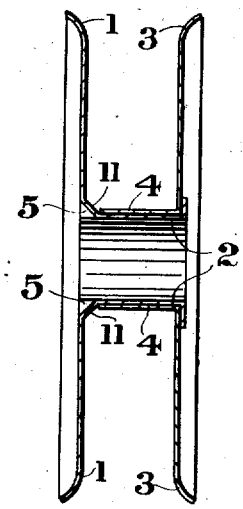
Figure 2:
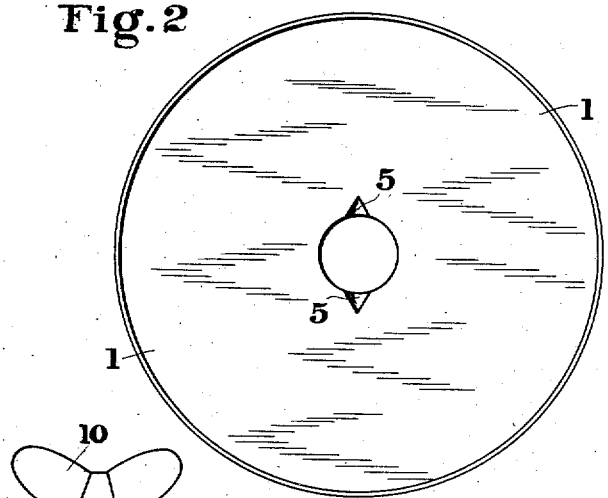
Figure 3:
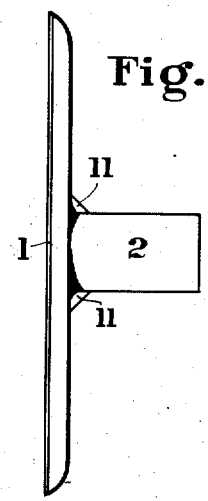
Figure 4:
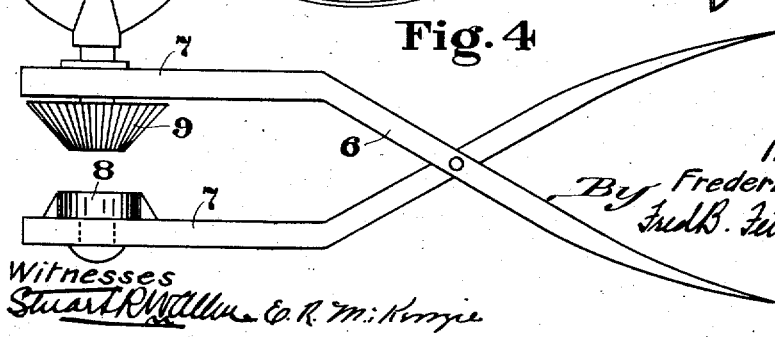

Figure 1.— is a sectional elevation of the device in position, Fig. 2.— is an end view of the disk or plate provided with a shank, showing the means employed for giving a grip, Fig. 3.— is a side elevation of the same, and Fig. 4.— shows a tool adapted for use in burring the end of the shank.

1 is a disk or plate provided with a tubular core or shank 2 which is adapted to be passed through a suitable hole punched in the ear of the animal and to receive a washer 3 which, in order to prevent pinching the ear is provided with a projecting flange 4 which is adapted when in place to bear against the inner side of the plate 1 or against a projection or shoulder formed upon the shank 2, as clearly shown in Fig 1.

In order to secure the device in place as above described, the portion of the shank 2 projecting upon the outside of the washer 3 is expanded or burred outwardly by means of a tapered reamer which is inserted in the bore and turned until the burring or beading is effected.

In order to enable the shank to be held from turning when the reamer is in use, the bore of the shank at a point where such shank joins the plate, is so formed that it will provide a grip for a suitable tool which is inserted in the said end of the bore. This may be effected in a variety of different ways as for instance by forming two indentations as shown in the drawings or else by making the end of the bore square, hexagonal, starred, or any other irregular shape and it must be clearly understood that I do not confine my invention to the formation as here shown.

In order that the method of using my invention may be fully understood, I have illustrated in Fig. 4, a tool suitable for the purpose which comprises a pair of hand tongs 6 having arranged in line upon the respective inner faces of their jaws 7 a projection or stud 8 of conformation to coincide with the grip portion of the bore of the shank in which it is inserted for the purpose of holding such shank from turning and a tapered reamer 9 adapted to be inserted in the projecting end of the shank and having a winged head 10 which may be gripped by the fingers and turned for the purpose of rotating the reamer.

In practice the plate 1 and the shank 2 may be stamped from one piece of metal in which case the indentations 4 would be formed by pressing the metal outwardly thus providing projections 11 upon the shank and against which the flange 4 of the washer 3 may bear. In a similar manner the washer 3 may be also stamped from a single piece of metal, thus providing a cheap and convenient method of manufacture.

In order to prevent the inner sides of the plate 1 and washer 3 from pressing against and chafing the ear of the animal, they are slightly curved outwardly as shown.

I claim:

In a device of the class described, a plate having a tubular shank adapted to be passed through a hole in the ear and having its free end adapted to be flanged, and a plate adapted to be placed upon the end of the shank, the portion of the shank which joins the first-named plate being formed for the purpose of providing a grip to prevent turning when the parts are being united, substantially as and for the purpose set forth.

In witness whereof I have hereunto set my hand in the presence of two witnesses.

FREDERICK ANDREWS.

Witnesses:
 JOHN EVANS,
 JOHN MURDOCK MCKENZIE.